US008948302B2

(12) United States Patent
Böhnke et al.

(10) Patent No.: US 8,948,302 B2
(45) Date of Patent: Feb. 3, 2015

(54) OFDM PRE-EQUALIZING

(71) Applicant: Sony Deutschland GmbH, Stuttgart (DE)

(72) Inventors: Ralf Böhnke, Esslingen (DE); Seiichi Izumi, Fellbach (DE)

(73) Assignee: Sony Deutschland GmbH, Cologne (DE)

( * ) Notice: Subject to any disclaimer, the term of this patent is extended or adjusted under 35 U.S.C. 154(b) by 0 days.

(21) Appl. No.: 14/041,998

(22) Filed: Sep. 30, 2013

(65) Prior Publication Data

US 2014/0029688 A1  Jan. 30, 2014

Related U.S. Application Data

(63) Continuation of application No. 13/892,798, filed on May 13, 2013, which is a continuation of application No. 12/108,552, filed on Apr. 24, 2008, now Pat. No. 8,457,250, which is a continuation of application No. 09/988,417, filed on Nov. 16, 2001, now Pat. No. 7,388,928.

(30) Foreign Application Priority Data

Nov. 20, 2000  (EP) ..................................... 00125436

(51) Int. Cl.
*H04L 25/49* (2006.01)
*H04L 1/06* (2006.01)
(Continued)

(52) U.S. Cl.
CPC ................ *H04L 1/06* (2013.01); *H04B 7/0613* (2013.01); *H04L 25/03343* (2013.01); *H04L 27/2626* (2013.01); *H04L 27/01* (2013.01); *H04L 1/0003* (2013.01); *H04L 2025/03808* (2013.01)
USPC .......................................... 375/296; 375/260

(58) Field of Classification Search
USPC .................................. 375/260, 295, 296, 297
See application file for complete search history.

(56) References Cited

U.S. PATENT DOCUMENTS

| 5,479,447 | A | * | 12/1995 | Chow et al. .................... 375/260 |
| 5,973,642 | A | | 10/1999 | Li et al. |
| 6,131,016 | A | | 10/2000 | Greenstein et al. |
| 6,373,433 | B1 | | 4/2002 | Espax et al. |

(Continued)

FOREIGN PATENT DOCUMENTS

| EP | 0 881 782 | 12/1998 |
| EP | 0 932 285 | 7/1999 |

(Continued)

OTHER PUBLICATIONS

Keller T. et al: "Sub-Band Adaptive Pre-Equalised OFDM Transmission" IEEE VTC 50th Vehicular Technology Conference (Cat. No. 99CH36324), Sep. 19-22, 1999, pp. 334-338 XP002144719.

(Continued)

*Primary Examiner* — Kevin Kim
(74) *Attorney, Agent, or Firm* — Oblon, Spivak, McClelland, Maier & Neustadt, L.L.P.

(57) ABSTRACT

For example in case of an OFDM multicarrier transmission system the transmission characteristics of subcarriers of a multicarrier transmission system using a plurality of antenna elements (3, 3') can be adjusted. Particularly the power and the phase of the subcarriers can be adapted. To this object the subcarrier frequency channel (2, 2') characteristics of the multicarrier transmission are detected (11, 11') at the side of the transmitter (3). The power of each subcarrier is then distributed by a weighting unit (14, 14'). The subcarriers can be further pre-equalized (1, 1') by dividing the subcarrier signal respectively by the sum of the squared magnitude of the frequency channel characteristics of all subcarrier signals or a frequency characteristic of the selected antenna element (3, 3').

28 Claims, 7 Drawing Sheets

(51) Int. Cl.
*H04B 7/06* (2006.01)
*H04L 25/03* (2006.01)
*H04L 27/26* (2006.01)
*H04L 27/01* (2006.01)
*H04L 1/00* (2006.01)

(56) References Cited

U.S. PATENT DOCUMENTS

| | | |
|---|---|---|
| 6,377,632 B1 | 4/2002 | Paulraj et al. |
| 6,587,510 B1 | 7/2003 | Minami et al. |
| 6,674,324 B1 | 1/2004 | Ocenasek et al. |
| 6,839,335 B1 | 1/2005 | Sudo |
| 7,042,957 B1 | 5/2006 | Zirwas |
| 7,684,756 B2 | 3/2010 | Bohnke et al. |
| 7,835,696 B2 | 11/2010 | Bohnke et al. |

FOREIGN PATENT DOCUMENTS

| | | |
|---|---|---|
| EP | 1 037 303 | 9/2000 |
| EP | 1 148 659 | 10/2001 |
| EP | 1 182 817 | 2/2002 |
| JP | 11-205205 | 7/1999 |
| WO | WO 97/26743 | 7/1998 |
| WO | WO 00/36769 | 6/2000 |

OTHER PUBLICATIONS

Database WPI, Selection EI. JP 11-205205, Week 199941, Derwent Publications Ltd., London, GB; AN 1999-485351, XP002171599.
U.S. Appl. No. 14/050,963, filed Oct. 10, 2013, Izumi.
U.S. Appl. No. 14/050,949, filed Oct. 10, 2013, Izumi.

* cited by examiner

OFDM PRE-EQUALIZING

CROSS-REFERENCE TO RELATED APPLICATIONS

This application is a continuation of U.S. application Ser. No. 13/892,798, filed May 13, 2013, which is a continuation of U.S. application Ser. No. 12/108,552, filed Apr. 24, 2008, which is a continuation of U.S. application Ser. No. 09/988,417, filed Nov. 16, 2001, the entire contents of which are hereby incorporated herein by reference. This application further is based upon and claims the benefit of priority from the European Patent Application No. 00 125 436.6 filed Nov. 20, 2000.

FIELD OF THE INVENTION

The present invention relates to a method for adjusting the transmission characteristics of subcarriers of a multicarrier transmission system using a plurality of antenna elements, to a computer software program product for implementing such a method when run on a computing device of a transmitting device, a transmission diversity device as well as to a base station comprising such a transmission diversity device.

BACKGROUND ART

To reduce interference from other transmitters, the transmission power should be as small as possible in any wireless transmission system. The background of the present invention is the reduction of transmission power in multicarrier systems and particularly the reduction of transmission power of OFDM wireless (LAN) systems. According to these systems a plurality of antenna elements share the transmission power. The transmission power of each subcarrier of the multicarrier transmission system can be adjusted such that the receiver can get a flat spectrum. In case sub-carriers are fading at all the antenna elements, these subcarriers should be transmitted with less power.

From EP 0 932 285 A2 a technique for the reduction of instantaneou maximum power in multicarrier signals is known. According to this technique from a serial-to-parallel converting part, complex information subcarrier signals based on an information bit sequence are outputted to a fast inverse Fourier transforming part. The fast inverse Fourier transforming part gives fast inverse Fourier transformation to inputted sub-carrier signals to obtain a complex baseband time waveform of OFDM symbols. A complex redundant subcarrier signal generating part generates complex redundant sub-carrier signals to reduce amplitude of a complex baseband time waveform of OFDM symbols, and makes them undergo fast inverse Fourier transformation together with complex information subcarrier signals. With these processes, the amplitude of a complex baseband time waveform of OFDM symbols is reduced and instantaneous maximum power is also reduced.

From WO 97/26743 a multicarrier communication system and method for peak power control is known. According to this technique a communication device for simultaneously transmitting information on multiple sub-channels encodes information for each of the multiple sub-channels with a coding scheme to produce channel encoded information. A mask vector derived from a redundancy in the coding scheme encodes the channel encoded information to transform the channel encoded information into codewords having pairwise Euclidean distance properties identical to those of the channel encoded information. Modulation of the sub-channels in accordance with the codewords in a modulators then produces a composite signal envelope having a peak-to-mean envelope power ratio reduced relative to a power ratio for correspondingly modulated channel encoded information.

From EP-O 881 782 A2 a single carrier maximum-ration synthetic transmission diversity device as shown in FIG. 8 is known. According to this known transmission diversity device antenna elements are arranged at intervals greater than J2. A signal received by an antenna element is sent by way of an antenna multiplexer to a receiver, where the signal is demodulated. The thus-demodulated signal is sent to a phase- and power detection section, where a phase and power of the signal are detected. On the basis of the result of such detection, a control section calculated the phase and power of a transmission signal. On the basis of the result of the calculation, a transmission signal generation circuit transmits a transmission signal to each of the antenna elements by way of the antenna multiplexer.

Note that the technique of EP 0 881 782 A2 claiming the calculation of the phase of a signal of each antenna cannot be applied to the multicarrier case, but only to a single carrier case, as it is impossible to measure phases of received signals if there are more than two carriers.

In single carrier applications the phase of the signal changes frequently as the symbols are transmitted serially. Therefore it is difficult to compare phases between different antennas, as the phase is not varying uniformly. Therefore in singles carrier applications a phase comparison is preferably done using pilot symbols which phases are varying uniformly or which are known.

From U.S. Pat. No. 5,973,642 adaptive antenna arrays for orthogonal frequency division multiplexing systems (OFDM systems) with co-channel interference is known. According to this known technique parameters for adaptive antenna arrays in OFDM systems with co-channel interference are estimated. The channel parameter estimation is performed using a two pass process that advantageously expands the temporal scope and considers past, present and future temporal channel estimations during parameter estimation. Channel parameters are estimated by processing the signals through fast Fourier transforms, temporal filters and inverse fast Fourier transforms. The temporal filters optimize parameters estimation based upon instantaneous correlation of the received signals. This all takes place on the receiver's side of the OFDM system.

The technique of transmission antenna selection of OFDM subcarrier using power measurement of received subcarriers in a TDD system is known of the Japanese patent 1 1(1999)-205205 of NTT Docomo.

High speed radio systems use a very wide radio bandwidth. Therefore, the channel characteristics cannot be flat for all subcarriers over the wide radio band even in short delay environment. Therefore, usually it is not possible to use a complicated modulation scheme such as 16 or 64 QAM for all subcarriers. On the other hand, any radio communication system suffers from interference from other communication transmitters.

Principally a subcarrier which is in fading can be transmitted with stronger power. This solves the bit error problems, but causes interference with other receivers and therefore reduces the total capacity of the system.

In view of the above-captioned prior art and problems it is the object of the present invention to propose a technique which is particularly adapted for lowering the transmission power in a multicarrier system such as the OFDM system without decreasing the overall bit rate.

This object is achieved by means of the features of the independent claims. The 5 dependent claims develop further the central idea of the present invention.

According to a first aspect of the present invention therefore a method for adjusting the transmission characteristics of subcarriers of a multicarrier transmission system using a plurality of antenna elements is proposed. On the transmitting side the subcarrier frequency channel characteristics of the multicarrier transmission is detected. Then the power of each subcarrier is distributed to the antenna elements by multiplying (weighting) it (by) the complex conjugate of the corresponding subcarrier frequency channel or [0, 1] value according to the decision which antenna is selected for the corresponding subcarrier to make the communication more efficient. Therefore depending on the detected frequency channel characteristics at each antenna element for each subcarrier signal the antenna element having the best channel characteristics for said subcarrier signal can be used for transmission.

The power of the subcarriers can furthermore be pre-equalized on the transmitter side by dividing the sub-carrier signals respectively by the sum of the squared magnitude of the frequency channel characteristics of all antenna elements or by the magnitude of the frequency channel characteristics of the selected antenna.

Along with the pre-equalizing furthermore the phase of the subcarrier signals can be respectively compensated for at the transmission side according to the detected frequency channel characteristics.

Alternatively or additionally, the phase can be compensated for at the receiving side.

The pre-equalization of the power of the subcarrier signal can be limited to an upper threshold value.

In case along with the pre-equalization the upper threshold is reached for a subcarrier signal, the transmission power of the corresponding subcarrier signal is fixed at the upper threshold value. Instead of further raising the transmission power the modulation scheme for said subcarrier is adapted.

The adaptation of the modulation scheme of a subcarrier signal can be signaled to the receiving side.

To adapt the modulation scheme of a subcarrier signal, the modulation scheme can be 10 simplified or the subcarrier signal can even not be modulated at all.

In case in a modulation scheme a subcarrier signal is adapted such that the bit rate of the subcarrier signal is reduced, the modulation scheme of at least one other subcarrier signal can be changed to a more complex modulation scheme.

The detection of the frequency channel characteristics can be performed on the basis of received pilot symbols.

According to a further aspect of the present invention a computer software program 20 product implementing a method as set forth above when run on a computing device of a transmitter is proposed.

According to a still further aspect of the present invention a transmission diversity device adapt for adjusting the transmission characteristics of subcarriers of a multicarrier transmission system and having a plurality of antenna elements is proposed. The transmission diversity device comprises means for detecting the frequency subcarrier channel characteristics of the multicarrier transmission. Furthermore, it comprises a means for distributing the power of each subcarrier is distributed to the antenna elements by multiplying (weighting) it (by) the complex conjugate of the corresponding subcarrier frequency channel or [0, 1] value according to the decision which antenna is selected for the corresponding subcarrier.

The equalizer can be furthermore adapted to divide the sub-carrier signals respectively by the sum of the squared magnitude of the frequency channel characteristics of all antenna elements or by the magnitude of the frequency channel characteristics of the selected antenna.

The device can furthermore comprise a pre-equalizer with a phase compensation function for adjusting the phase of the subcarriers respectively according to the detected frequency channel characteristics.

The pre-equalizer can limit the power of the subcarrier to an upper threshold. The device can be a base station of a wireless transmission system, such as the OFDM system.

Further features, objects and advantages of the present invention will become evident for the man skilled in the art when reading the following detailed description of embodiments of the present invention taken in conjunction with the figures of the enclosed drawings.

Figure 3:
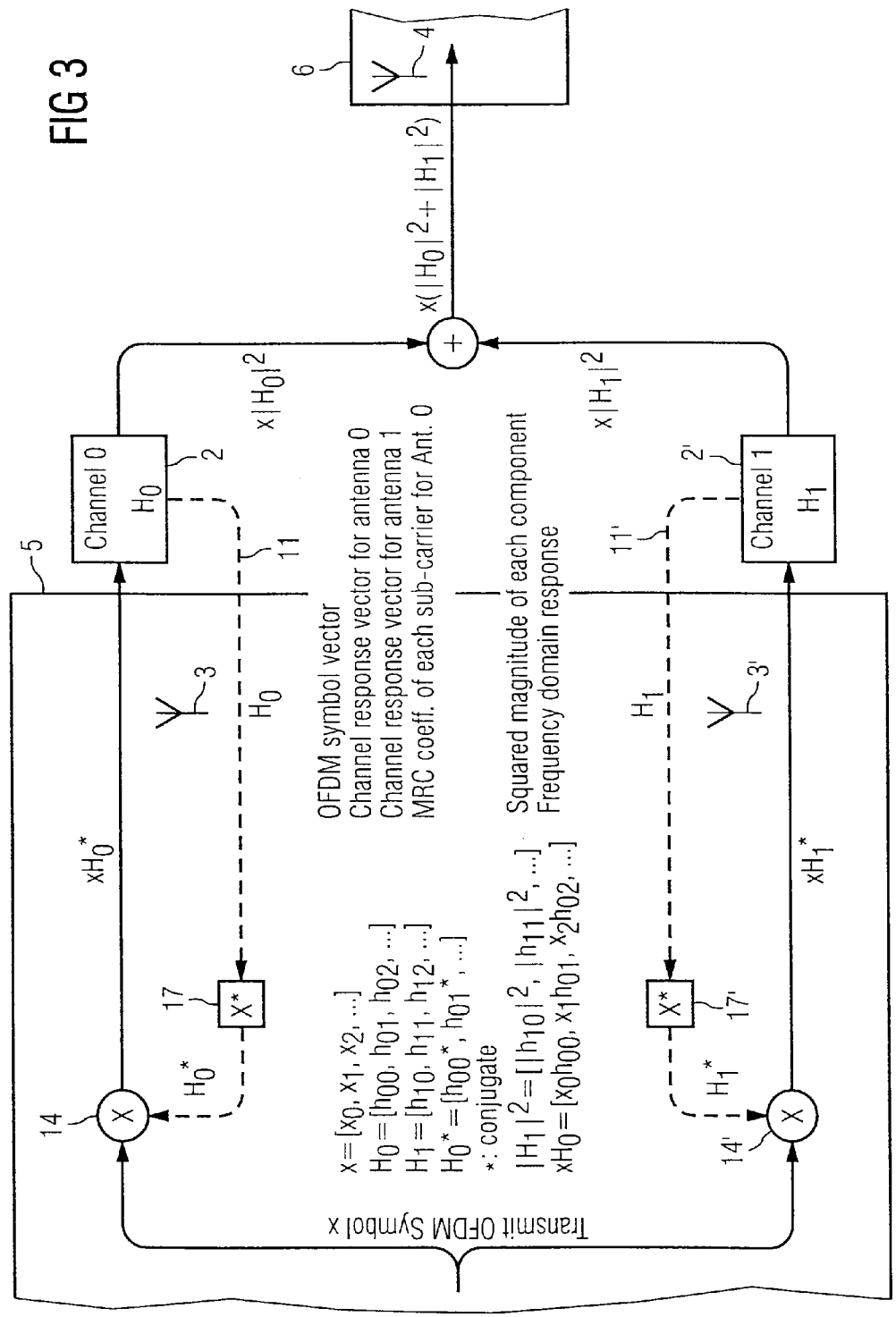
Figure 4:
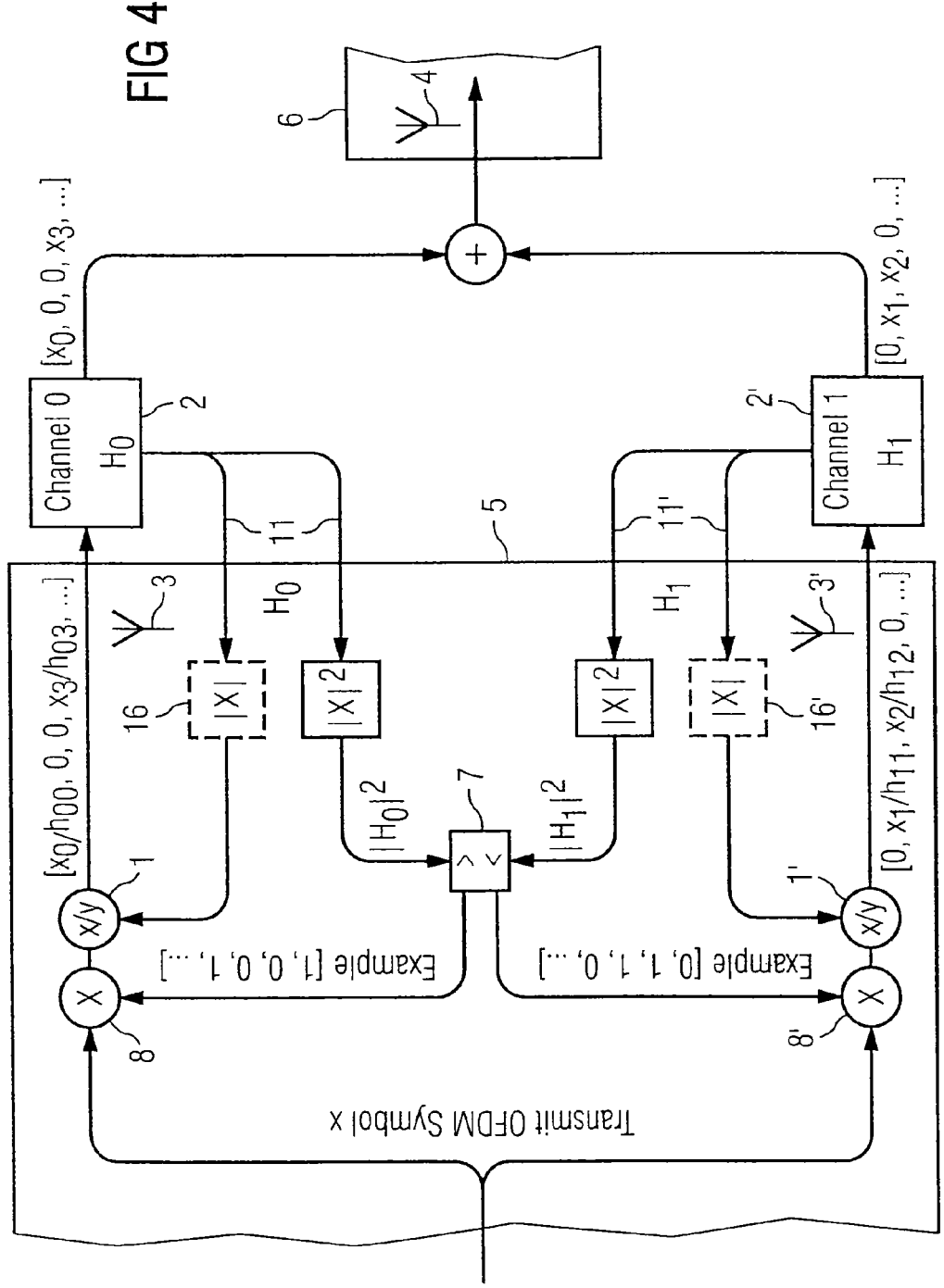
Figure 5:
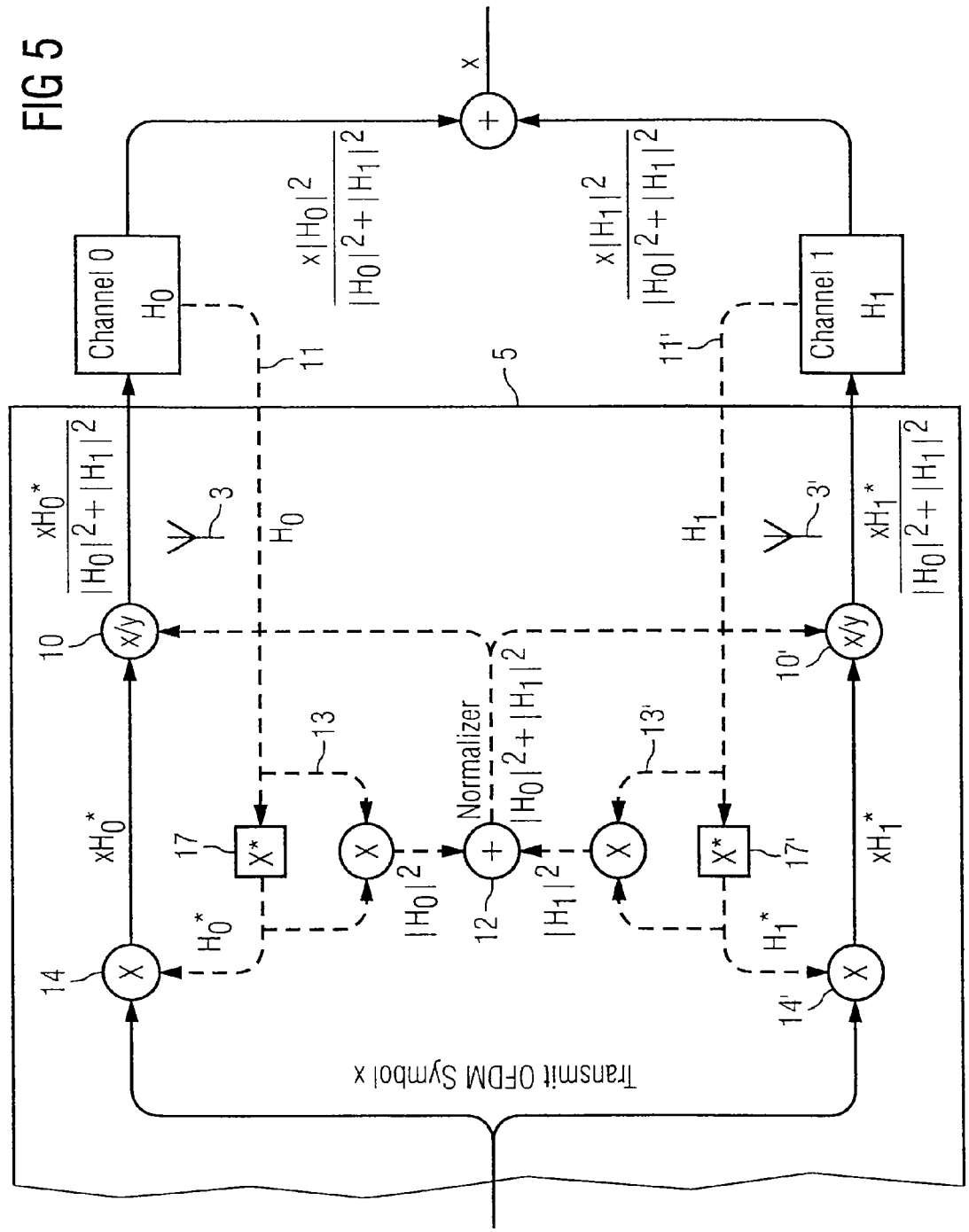
Figure 6A:
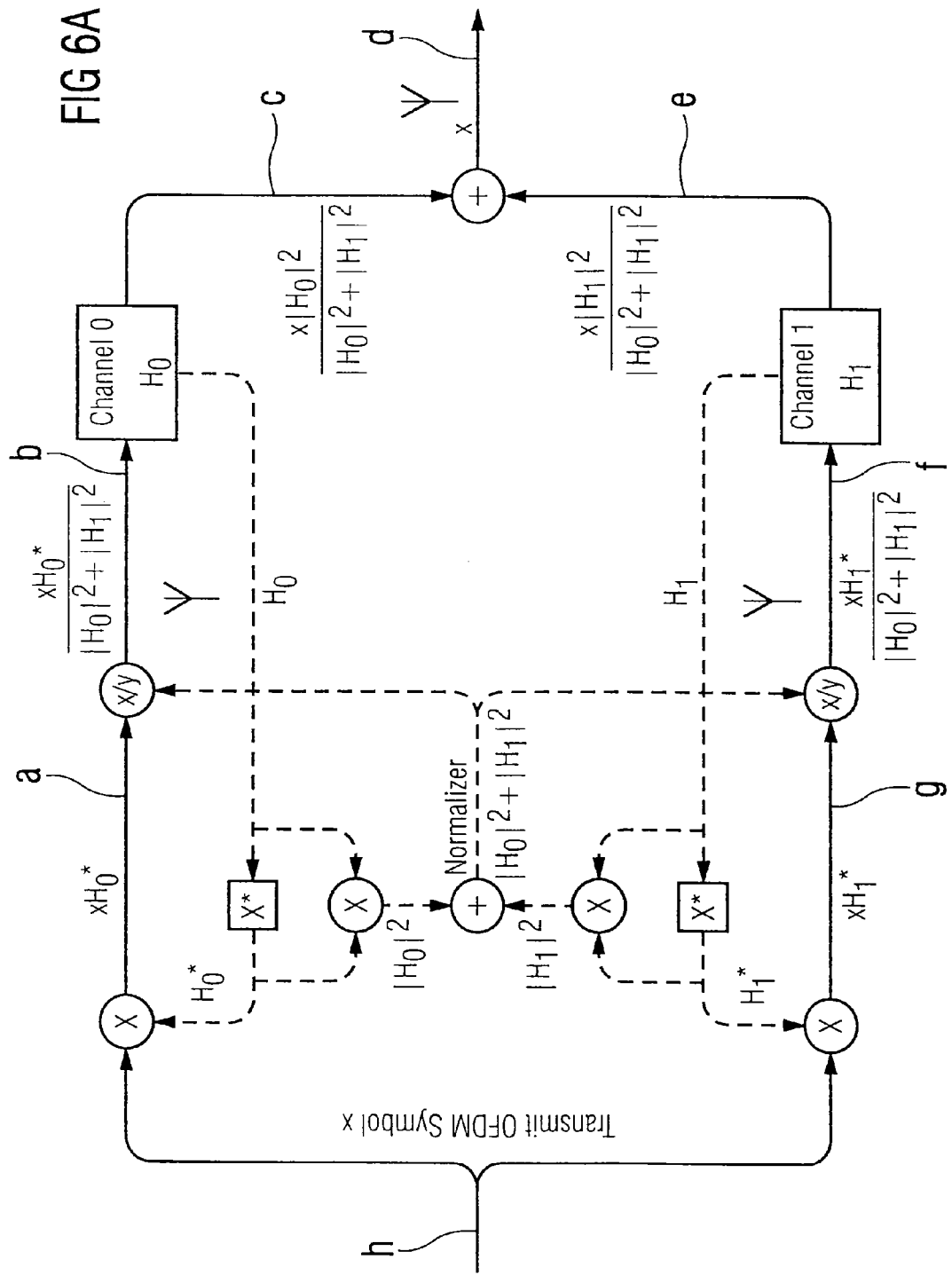
Figure 6B:
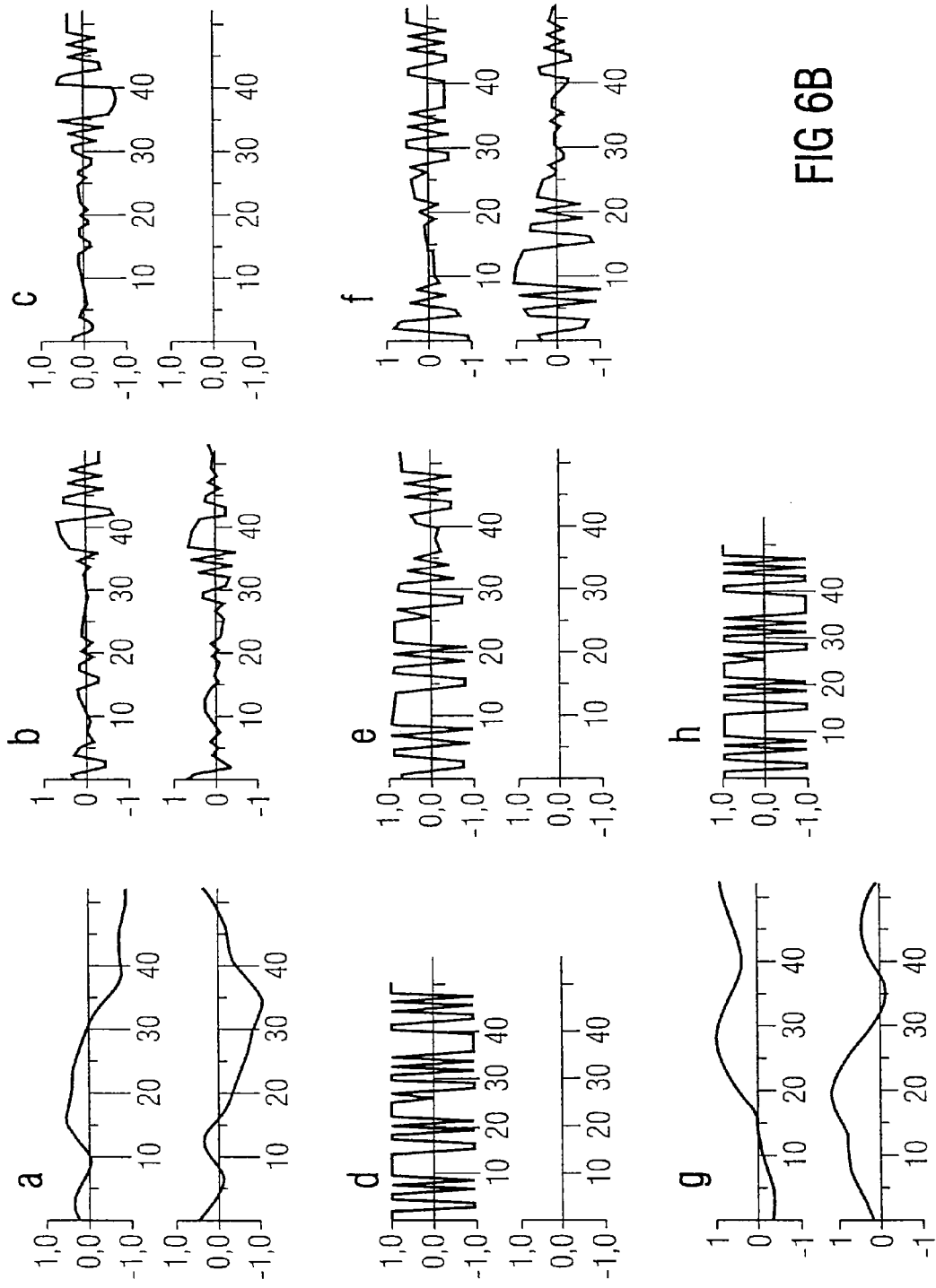

FIG. 3 shows the maximum ratio combining (MRC) technique in the case of two antennas, FIG. 4 shows an antenna selection technique together with a preequalizing applied to the case of two antennas on the transmitting side, FIG. 5 shows the maximum ratio combining technique with pre 3 equalizing applied to the case of two antennas, FIG. 6A shows an example to explain the function of a MRC preequalizer with two antennas, and FIG. 6B shows an example to explain the function of a MRC preequalizer with two antennas.

For the sake of clarity at first some technical terms will be shortly explained: "TX diversity" designates the distribution of the power of a transmission signal on a plurality of antenna elements. The distribution of the power can be achieved f.e. by means of an antenna selection or a MRC (Maximum ratio combining) technique. According to the antenna selection technique, the entire power of the transmission signal is supplied to one antenna element, whereas according to the MRC technique the power is distributed according to the channel response, wherein both the amplitude and/or the phase of the channel response vector can be taken into account.

Following the TX diversity block, according to the invention a "pre-equalizer" can be provided at the transmitter side. The pre-equalizer can modify subcarriers of a multicarrier transmission system such that they arrive equally (in amplitude and/or phase) at the receiving side.

Figure 1:
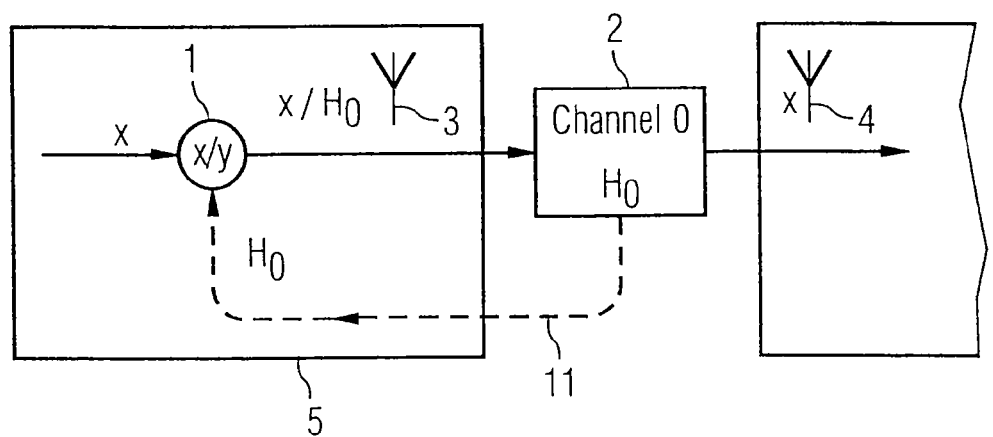
FIG. 1 shows a pre-equalization technique using one antenna.

Finally on the receiving side an equalizer can be provided to equalize all received subcarriers in amplitude and/or phase (but of course not the modulation constellation). With reference to FIG. 1 at first the pre-equalizing technique for one antenna will be explained. An OFDM symbol vector $$x=[x_0,x_1,x_2,\ldots]$$

is transmitted by means of an antenna 3 of a transmitter 5 over a wireless channel 2 to 25 an antenna 4 of a receiver 6. The channel response of the channel 2 can be represented as a vector H, wherein each vector element is associated with one frequency subcarrier channel:

$$H,)[h_{00},h_{01},h_{02},\ldots]$$

In the shown pre-equalization technique, the channel response vector $H_0$ representing the channel characteristics for both amplitude (fading) and phase (phase shift) can be detected 11 in a pilot phase by means of a evaluation of the transmitted symbol xH0 (without pre-equalization). The channel response vector $H_0$ is used in a pre-equalizer 1 such that a pre-equalized symbol vector $x/H_0$ is actually transmitted and the original OFDM symbol vector x is thus received at the antenna 4 of the receiver 6. As shown the pre-equalization is effected based on the knowledge of the channel response vector $H_0$.

Figure 2:
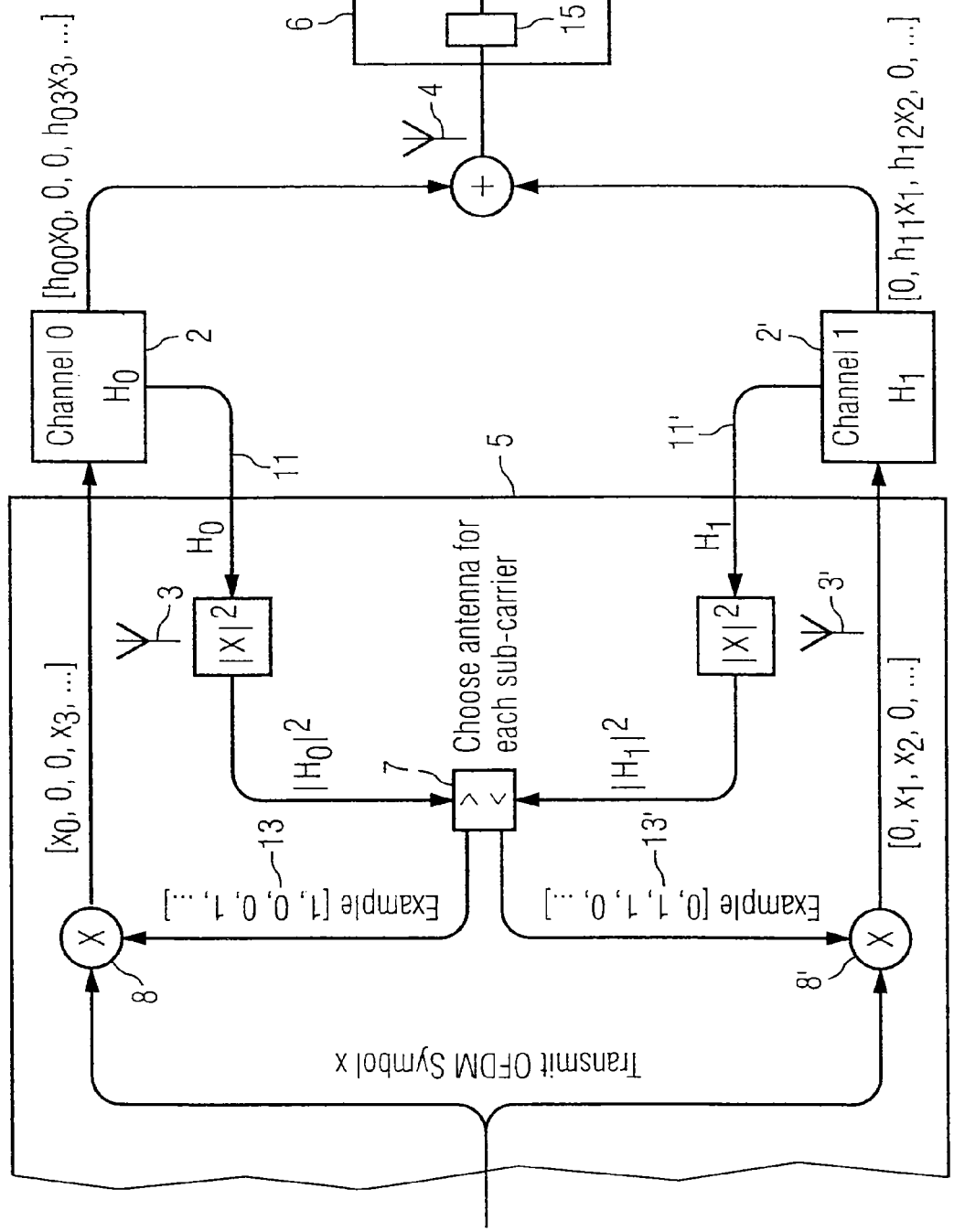
FIG. 2 shows an antenna selection technique without equalizing.

FIG. 2 shows an antenna selection technique in the case of an application to two antenna elements 3, 3'. The OFDM symbol vector x is at first supplied to each of the antennas 3, 3' to be transmitted over two different channels $H_0$, $H_1$, (references 2, 2'). The channel response vectors $H_0$, $H_1$, of the two channels 2, 2' are respectively detected 15 11, 11' for example by means of an evaluation of pilot symbols transmitted from the
receiver 6 to the transmitter 5 and the squared magnitude of the channel response vectors $|H_0|^2$ and $|H_1|^2$ is respectively calculated. Depending on the calculated squared magnitude of the channel response vector $H_0$ and $H_1$, a decision/selection unit 7 decides and selects the best suited antenna element 3 or 3' for each subcarrier. To achieve this object the decision/selection unit 7 outputs for example bit strings 13 and 13', respectively, which are then multiplied in multiplying units 8, 8' with the input OFDM symbol vector x. According to this technique the best suited antenna element for each subcarrier can be chosen, i.e. the antenna element with the best channel response (inverse of the squared magnitude of the channel response vector) of each subcarrier is chosen.

FIG. 3 shows a maximum ratio combining (MRC) technique applied on a two antenna transmission system. As shown in FIG. 3 again a channel response vector $H_0$ and $H_1$, is detected ii, 11' and the complex conjugate 17, 17' of the channel response $H_0^*$ and $H_1^*$, respectively is multiplied by a weighting unit 14, 14' with the OFDM symbol vector x to be transmitted. This weighting unit 14, 14' for each antenna element 3, 3' provides for a TX antenna distribution by applying an appropriate weight. The power of the subcarrier channels is therefore distributed to each antenna element proportionally to each channel response. The phase of the signal can also be adjusted at TX antenna elements 3, 3', so that the phase at all distributed signals from different antenna elements 3, 3' can meet equally the receiving antenna 4.

According to the present invention an antenna diversity and an pre-equalizing step can be additionally used at the transmitter. The transmitter antenna diversity technique includes the above explained TX antenna selection technique and maximum ratio combining (MRC) method.

With reference to FIGS. 4 to 6 now the normalizing of the transmission power of each subcarrier will be explained.

FIG. 4 shows an antenna selection technique combined with the pre-equalizing and applied to a two antenna system.

As the sub-units of the transmitter 5 shown in FIG. 4 have already been explained with reference to FIGS. 1, 2 and 3, the same reference signs are used in FIG. 4 and reference is made to the cited figures. As shown in FIG. 4, after the selection of a transmission antenna element 3, 3', each subcarrier channel is divided in a division (pre-equalizing) unit 1, 1' by the channel response vector H0 of the selected channel.

The subcarrier channel can alternatively be divided by the magnitude of the selected channel (see reference 16, 16' in FIG. 4). In this case only the power profile of the channel is compensated for. If only the power profile, but not the phase of the channel is compensated, the phase of the channel can be compensated at the receiver side 6.

FIG. 5 shows a further embodiment of the present invention according to which the maximum ratio combining (MRC) technique is combined with a pre-equalizing and applied to a two antenna 3, 3' system. In addition to the system shown in FIG. 3 each channel is pre-equalized 10, 10'. As shown in FIG. 5 the squared magnitude of each of the channel response vectors $H_0$ and $H_1$ of each subcarrier channel is calculated 13, 13'. An adding unit 12 then adds up the calculated squared magnitude of all channel response vectors and supplies the result to further pre-equalizing units 10, 10'.

Respectively one further pre-equalizing unit 10, 10' is provided for each channel 2, 2' 5 dividing the pre-equalized sub-carrier channel xH and xH, respectively, by the sum of the squared magnitudes of the channel response vectors $H_0$ and $H_1$.

As the weighting units 14, 14' use the complex conjugate of the channel response vector $H_0$ and $H_1$ according to the embodiment of FIG. 5 both the amplitude (fading) 10 and the phase (phase shift) of the respective channel is compensated for.

Therefore, after the distribution to all antenna elements 3, 3', the distributed subcarrier signal can be pre-equalized 10, 10'.

A relatively high transmission power which may cause interference can be required in 15 some subcarrier channels. These subcarrier channels are those which present a fading dip with all antenna elements 3, 3'. Using a plurality of antenna elements 3, 3', the number of subcarrier channels which require a high transmission power can be dramatically reduced compared to a single antenna case.

As a measure to further decrease the interference problem, the transmission power can be limited by the equalizers 1, 1' at a certain upper threshold value. In case the equalization step results in a transmission power judging said threshold value, the transmission power is no longer increased but the modulation scheme is changed to a simple one in the corresponding subcarrier channels. Therefore, the pre-equalization is only done until the predetermined power threshold value is reached. At this predetermined power threshold level value the transmission power is limited to prevent interference to increase. Instead of further increasing the transmission power of the sub-carrier channel, a simpler modulation scheme is used to those subcarrier channels or these subcarrier channles are not modulated at all to prevent bit errors to be generated. The use of a simpler modulation scheme for some of the subcarrier channels results in a reduced bit rate which can be compensated for by changing the modulation scheme in other sub-carriers (which are in better condition) to a more complicated one.

This modulation scheme shift (adaptation) can be cited for example at the transmitter (base station) side and then signaled to the other side (for example mobile station).

The channel responses can particularly be estimated from received pilot symbols.

The main advantage of the present invention is that the error rate can be reduced for example by means of the pre-equalization. At the same time the transmission power can be reduced by a combination of pre-equalization or antenna selection or MRC technique. By means of an adaptive modulation technique the transmission power can be further limited. Therefore, the capacity of a network can be increased all by keeping the quality of each communication constant.

The invention claimed is:
1. A method for transmitting an orthogonal frequency division multiplex (OFDM) signal via a plurality of antennas in a wireless transmission system, the OFDM signal carried by a plurality of subcarrier frequencies, the method comprising:
    acquiring channel characteristics of one of the plurality of subcarrier frequencies;

determining, by processing circuitry, a transmission power allocation vector for the one of the plurality of subcarrier frequencies based on the channel characteristics; and allocating, by the processing circuitry, a power for the one of the plurality of subcarrier frequencies to an associated one of the plurality of antennas based on multiplication with the transmission power allocation vector, wherein the acquiring, the determining, and the allocating are performed for each of the plurality of subcarrier frequencies, and the power allocated to the one of the plurality of subcarrier frequencies is normalized with a normalized power allocation vector that is determined for the one of the plurality of subcarrier frequencies.

2. The method of claim 1, wherein the channel characteristics are acquired via a receiving interface.

3. The method of claim 1, wherein the channel characteristics are frequency channel characteristics.

4. The method of claim 1, further comprising:
transmitting the OFDM signal, in accordance with the power allocated to the one of the plurality of subcarrier frequencies, via said associated one of the plurality of antennas, wherein the transmitting is performed for each of the plurality of subcarrier frequencies.

5. The method of claim 1, further comprising:
compensating for a phase of a subcarrier signal carried by the one of the plurality of subcarrier frequencies, at a transmitter according to said channel characteristics, wherein the compensating is performed for each of the plurality of subcarrier frequencies.

6. The method of claim 1, further comprising:
applying said normalized power allocation vector by weighting a subcarrier symbol carried by the one of the plurality of subcarrier frequencies, wherein the applying is performed for each of the plurality of subcarrier frequencies.

7. The method of claim 1, further comprising:
adjusting at least one of an amplitude and a phase of a subcarrier signal carried by the one of the plurality of subcarrier frequencies in accordance with said channel characteristics of the one of the plurality of subcarrier frequencies or channel characteristics of the plurality of subcarrier frequencies, via said associated one of the plurality of antennas, wherein the adjusting is performed for each of the plurality of subcarrier frequencies.

8. The method of claim 7, wherein the adjustment comprises:
limiting an adjustment of a magnitude of the subcarrier signal carried by the one of the plurality of subcarrier frequencies to an upper threshold;
stopping the adjustment when the subcarrier signal when the upper threshold is exceeded; and changing a modulation scheme for the subcarrier signal for which the upper threshold is exceeded, wherein the limiting, the stopping, and the changing is performed for each of the plurality of subcarrier frequencies.

9. The method of claim 1, further comprising:
obtaining a subcarrier channel response vector, corresponding to the associated one of said plurality of antennas, wherein the obtaining is performed for each of said plurality of subcarrier frequencies.

10. The method of claim 9, wherein said subcarrier channel response vector has at least one subcarrier related element corresponding to the one of said plurality of subcarrier frequencies.

11. The method of claim 10, further comprising:
applying a weighting value to the one of said plurality of subcarrier frequencies, which carries OFDM symbols of the OFDM signal, in accordance with a complex conjugate of said subcarrier channel response vector, wherein the applying is performed for each of the plurality of subcarrier frequencies.

12. A transmission device for transmitting an orthogonal frequency division multiplex (OFDM) signal via a plurality of antennas in a wireless transmission system, the OFDM signal carried by a plurality of subcarrier frequencies, the device comprising:
circuitry configured to acquire channel characteristics of one of the plurality of subcarrier frequencies,
determine a transmission power allocation vector for the one of the plurality of subcarrier frequencies based on the channel characteristics, and
allocate a power for the one of the plurality of subcarrier frequencies to an associated one of the plurality of antennas based on multiplication with the transmission power allocation vector,
wherein the circuitry performs the acquiring, the determining, and the allocating for each of the plurality of subcarrier frequencies, and
the power allocated to each of the plurality of subcarrier frequencies is normalized with a normalized power allocation vector that is determined for the one of the plurality of subcarrier frequencies.

13. The transmission device of claim 12, wherein the channel characteristics are frequency channel characteristics.

14. The transmission device of claim 12, wherein the circuitry is further configured to transmit the OFDM signal, in accordance with the power allocated to the one of the plurality of subcarrier frequencies, via said associated one of the plurality of antennas, and the circuitry performs the transmitting for each of the plurality of subcarrier frequencies.

15. The transmission device of claim 12, wherein the circuitry is further configured to compensate for a phase of a subcarrier signal carried by the one of the plurality of subcarrier frequencies, at a transmitter according to said channel characteristics, and
the circuitry performs the compensating for each of the plurality of subcarrier frequencies.

16. The transmission device of claim 12, wherein the circuitry is further configured to apply said normalized power allocation vector by weighting a subcarrier symbol carried by the one of the plurality of subcarrier frequencies, and
the circuitry performs the applying for each of the plurality of subcarrier frequencies.

17. The transmission device of claim 12, wherein the circuitry is further configured to adjust at least one of an amplitude and a phase of a subcarrier signal carried by the one of the plurality of subcarrier frequencies in accordance with said channel characteristics of the one of the plurality of subcarrier frequencies or channel characteristics of the plurality of subcarrier frequencies, via said associated one of the plurality of antennas, and
the circuitry performs the adjusting for each of the plurality of subcarrier frequencies.

18. The transmission device of claim 17, wherein the adjustment comprises:
limiting an adjustment of a magnitude of the subcarrier signal carried by the one of the plurality of subcarrier frequencies to an upper threshold; stopping the adjustment when the subcarrier signal when the upper threshold is exceeded; and changing a modulation scheme for the subcarrier signal for which the upper threshold is exceeded, and the limiting, the stopping, and the changing are performed for each of the plurality of subcarrier frequencies.

19. The transmission device of claim 12, wherein the circuitry is further configured to obtain a subcarrier channel response vector s, corresponding to the associated one of said plurality of antennas, and the circuitry performs the obtaining for each of said plurality of subcarrier frequencies.

20. The transmission device of claim 19, wherein said subcarrier channel response vector s has at least one subcarrier related element corresponding to the one of said plurality of subcarrier frequencies.

21. The transmission device of claim 20, wherein the circuitry is further configured to apply a weighting value to the one of said plurality of subcarrier frequencies, which carries OFDM symbols of the OFDM signal, in accordance with a complex conjugate of said subcarrier channel response vector, and the applying is performed for each of the plurality of subcarrier frequencies.

22. The transmission device of claim 12, further comprising the plurality of antennas.

23. The transmission device of claim 22, wherein the plurality of antennas includes two antennas.

24. A wireless system for communicating an orthogonal frequency division multiplex (OFDM) signal via a plurality of antennas, the OFDM signal carried by a plurality of subcarrier frequencies, the wireless system comprising:

transmitter circuitry configured to acquire channel characteristics of one of the plurality of subcarrier frequencies, determine a transmission power allocation vector for the one of the plurality of subcarrier frequencies based on the channel characteristics, and allocate a power for the one of the plurality of subcarrier frequencies to an associated one of the plurality of antennas based on multiplication with the transmission power allocation vector, wherein transmitting circuitry performs the acquiring, the determining, and the allocating for each of the plurality of subcarrier frequencies; and receiver circuitry configured to receive the OFDM signal transmitted by the transmitter circuitry, wherein the power allocated to each of the plurality of subcarrier frequencies is normalized with a normalized power allocation vector that is determined for the one of the plurality of subcarrier frequencies.

25. A receiver incorporating circuitry configured to receive at least one OFDM signal carried by a plurality of subcarrier frequencies via plurality of antennas, said receiver forming part of a wireless transmission system for communicating OFDM signal, said wireless transmission system comprising:

circuitry configured to acquire channel characteristics of one of the plurality of subcarrier frequencies, determine a transmission power allocation vector for the one of the plurality of subcarrier frequencies based on the channel characteristics, and allocate a power for the one of the plurality of subcarrier frequencies to an associated one of the plurality of antennas based on multiplication with the transmission power allocation vector, wherein the circuitry performs the acquiring, the determining, and the allocating for each of the plurality of subcarrier frequencies, and the power allocated to each of the plurality of subcarrier frequencies is normalized with a normalized power allocation vector that is determined for the one of the plurality of subcarrier frequencies.

26. The receiver of claim 25, wherein the channel characteristics are frequency channel characteristics.

27. The receiver of claim 26, further comprising: circuitry configured to obtain a subcarrier channel response vector corresponding to the associated one of said plurality of antennas, the obtaining being performed for each of said plurality of subcarrier frequencies.

28. The receiver of claim 27, wherein said subcarrier channel response vector has at least one subcarrier related element corresponding to the one of said plurality of subcarrier frequencies.

* * * * *